United States Patent
Hayama et al.

(10) Patent No.: US 12,180,950 B2
(45) Date of Patent: Dec. 31, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 269 days.

(21) Appl. No.: 17/600,529

(22) PCT Filed: Apr. 2, 2020

(86) PCT No.: PCT/JP2020/015180
§ 371 (c)(1),
(2) Date: Sep. 30, 2021

(87) PCT Pub. No.: WO2020/204135
PCT Pub. Date: Oct. 8, 2020

(65) Prior Publication Data
US 2022/0213877 A1    Jul. 7, 2022

(30) Foreign Application Priority Data
Apr. 3, 2019   (JP) ................... 2019-071634

(51) Int. Cl.
*F04B 27/18*    (2006.01)
*F04B 49/22*    (2006.01)
*F16K 31/06*    (2006.01)

(52) U.S. Cl.
CPC ......... *F04B 27/1804* (2013.01); *F04B 49/22* (2013.01); *F16K 31/0655* (2013.01);
(Continued)

(58) Field of Classification Search
CPC ............ F04B 27/1804; F04B 49/22; F04B 2027/1813; F04B 2027/1831; F04B 27/22; F16K 31/0655
See application file for complete search history.

(56) References Cited

U.S. PATENT DOCUMENTS

| | | | |
|---|---|---|---|
| 3,765,644 A | 10/1973 | Zeuner | F16K 31/0655 |
| 4,291,860 A | 9/1981 | Bauer | F16K 31/0655 |

(Continued)

FOREIGN PATENT DOCUMENTS

| | | | |
|---|---|---|---|
| CN | 2869383 | 2/2007 | F04B 49/22 |
| CN | 102384056 | 3/2012 | F04B 27/14 |

(Continued)

OTHER PUBLICATIONS

Chinese Official Action issued in related Chinese Application Serial No. 202080026556.1, dated Oct. 9, 2022, 9 pages.

(Continued)

*Primary Examiner* — Alexander B Comley
(74) *Attorney, Agent, or Firm* — HAYES SOLOWAY P.C.

(57) ABSTRACT

A capacity control valve includes a valve housing provided with a suction port through which a suction fluid of suction pressure Ps passes, and a control port through which a control fluid of control pressure Pc passes, a valve element configured to be driven by a solenoid, a spring that biases the valve element in a direction opposite to a driving direction of the solenoid, and a CS valve formed by a CS valve seat and the valve element, the CS valve being configured for opening and closing a communication between the control port and the suction port in accordance with a movement of the valve element. The capacity control valve further includes communication controller that controls a communication between the control port and a space on a back surface side of the valve element.

15 Claims, 12 Drawing Sheets

(52) U.S. Cl.
CPC ............... *F04B 2027/1813* (2013.01); *F04B 2027/1831* (2013.01); *F04B 2027/1854* (2013.01); *F04B 2027/1859* (2013.01)

(56) References Cited

U.S. PATENT DOCUMENTS

| | | | |
|---|---|---|---|
| 5,022,629 A | 6/1991 | Tibbals | B05B 1/3053 |
| 5,076,538 A | 12/1991 | Mohr | B60T 15/028 |
| 5,199,855 A | 4/1993 | Nakajima | F04C 28/14 |
| 5,277,552 A | 1/1994 | Higuchi | F04B 27/1804 |
| 5,326,079 A | 7/1994 | Ferrando | |
| 5,401,087 A | 3/1995 | Goossens | F16J 15/56 |
| 5,503,184 A | 4/1996 | Reinartz | B60T 8/367 |
| 6,142,445 A | 11/2000 | Kawaguchi | F16K 31/0613 |
| 6,217,292 B1 | 4/2001 | Ota | F04B 27/1804 |
| 6,234,763 B1 | 5/2001 | Ota et al. | 417/222.2 |
| 6,244,159 B1 | 6/2001 | Kimura et al. | |
| 6,250,600 B1 | 6/2001 | Kumagai | G05D 16/0619 |
| 6,350,106 B1 | 2/2002 | Shimizu | F04B 27/1804 |
| 6,398,516 B1* | 6/2002 | Kawaguchi | F04B 49/065 417/222.2 |
| 6,443,708 B1 | 9/2002 | Hirota | F04B 27/1804 |
| 6,481,976 B2 | 11/2002 | Kimura | F04B 27/1804 |
| 6,585,494 B1 | 7/2003 | Suzuki | F25B 9/008 |
| 6,644,621 B2 | 11/2003 | Ji | B60T 13/686 |
| 6,772,990 B2 | 8/2004 | Sasaki et al. | |
| 6,893,215 B2 | 5/2005 | Kuwabara et al. | |
| 6,976,665 B2 | 12/2005 | Seitz | B06T 8/363 |
| 7,014,427 B1 | 3/2006 | Hirota | 417/218 |
| 8,418,723 B2 | 4/2013 | Tsuchiya | F16K 31/0655 |
| 8,550,427 B2 | 10/2013 | Yoshida | B60T 8/363 |
| 9,334,978 B2 | 5/2016 | Lappan | F04C 2/3442 |
| 9,581,149 B2 | 2/2017 | Ota et al. | |
| 9,651,037 B2 | 5/2017 | Sakakibara | F04B 1/26 |
| 10,077,849 B2 | 9/2018 | Iwa et al. | F16K 31/06 |
| 10,316,975 B2 | 6/2019 | Fangauer | F16K 1/38 |
| 10,364,897 B2 | 7/2019 | Vu | |
| 10,781,804 B2 | 9/2020 | Higashidozono | F04B 27/18 |
| 10,823,162 B2 | 11/2020 | Kume et al. | |
| 10,837,431 B2 | 11/2020 | Tonegawa et al. | F04B 27/18 |
| 10,907,624 B2 | 2/2021 | Kume et al. | F04B 27/18 |
| 11,215,293 B2 | 1/2022 | Fukuda | F04B 53/10 |
| 11,231,111 B2 | 1/2022 | Hurst | F04B 53/102 |
| 11,320,061 B2 | 5/2022 | Nishimura et al. | F16K 31/06 |
| 11,480,166 B2 | 10/2022 | Hayama | F04B 27/10 |
| 11,603,832 B2 | 3/2023 | Higashidozono et al. | |
| 2002/0031432 A1 | 3/2002 | Ota et al. | F04B 1/26 |
| 2002/0098091 A1 | 7/2002 | Umemura | F04B 27/1804 |
| 2003/0019226 A1 | 1/2003 | Hirota | F04B 27/1804 |
| 2004/0060604 A1 | 4/2004 | Uemura | G05D 16/0619 |
| 2004/0091368 A1 | 5/2004 | Kainuma | F04B 27/1804 |
| 2004/0118140 A1 | 6/2004 | Umemura et al. | F25B 41/04 |
| 2005/0287014 A1 | 12/2005 | Umemura et al. | F04B 1/26 |
| 2006/0237552 A1 | 10/2006 | Umemura | F16K 31/0655 |
| 2007/0069576 A1 | 3/2007 | Suzuki | B60T 8/363 |
| 2007/0164244 A1 | 7/2007 | Kratzer | F16K 31/0658 |
| 2007/0267078 A1 | 11/2007 | Collet et al. | F15B 13/04 |
| 2008/0175727 A1 | 7/2008 | Umemura | F04B 27/1804 |
| 2010/0264342 A1 | 10/2010 | Heyer | F16K 31/0655 |
| 2011/0042605 A1 | 2/2011 | Gyger | F16K 25/005 |
| 2011/0091334 A1 | 4/2011 | Taguchi | F04B 27/1804 |
| 2012/0056113 A1 | 3/2012 | Tano et al. | F16K 31/12 |
| 2013/0291963 A1 | 11/2013 | Futakuchi et al. | |
| 2014/0369862 A1* | 12/2014 | Ota | F04B 27/1804 417/222.2 |
| 2015/0044065 A1 | 2/2015 | Ota et al. | |
| 2015/0211502 A1 | 7/2015 | Ota et al. | F04B 7/0076 |
| 2015/0345655 A1* | 12/2015 | Higashidozono | F04B 27/1804 137/624.27 |
| 2016/0053755 A1 | 2/2016 | Taguchi | F04B 27/1804 |
| 2016/0186733 A1 | 6/2016 | Sugamura et al. | F04B 27/1804 |
| 2017/0175723 A1* | 6/2017 | Kume | F04B 27/1804 |
| 2017/0314700 A1 | 11/2017 | Iwanaga et al. | F16K 31/0675 |
| 2018/0056954 A1 | 3/2018 | Kollmann | F16K 31/0658 |
| 2019/0331249 A1 | 10/2019 | Borja | F16K 1/44 |

FOREIGN PATENT DOCUMENTS

| | | | |
|---|---|---|---|
| CN | 103671033 | 3/2014 | F04B 39/08 |
| CN | 105736308 | 7/2016 | F04B 39/00 |
| CN | 109416133 | 3/2019 | F16K 31/06 |
| EP | 0255764 | 7/1987 | F04B 1/28 |
| EP | 0945617 | 9/1999 | F04B 27/18 |
| EP | 0945618 | 9/1999 | F04B 27/18 |
| EP | 0980976 | 2/2000 | F04B 27/18 |
| EP | 1091125 | 4/2001 | F04B 27/18 |
| EP | 1098091 | 5/2001 | F04B 27/18 |
| EP | 1052124 | 11/2002 | B60H 1/32 |
| EP | 1279831 | 1/2003 | F04B 27/18 |
| EP | 1375918 | 1/2004 | F04B 27/18 |
| EP | 1512871 | 3/2005 | F04B 27/18 |
| EP | 2952741 | 12/2015 | F16K 31/06 |
| EP | 2963293 | 1/2016 | F04B 27/10 |
| GB | 787961 | 12/1957 | F04B 43/067 |
| JP | S62170466 | 10/1987 | F16K 31/06 |
| JP | 7-27049 | 1/1995 | F04B 24/10 |
| JP | 2000-87849 | 3/2000 | F04B 27/18 |
| JP | 2000-161234 | 6/2000 | F04B 49/00 |
| JP | 3242496 | 10/2001 | F04B 27/14 |
| JP | 2002-70732 | 3/2002 | F04B 27/14 |
| JP | 2002070732 A * | 3/2002 | |
| JP | 2002-201913 | 7/2002 | F01D 11/00 |
| JP | 2003-322086 | 11/2003 | F04B 49/00 |
| JP | 2004162856 | 6/2004 | F16K 31/06 |
| JP | 3581598 | 7/2004 | F04B 29/10 |
| JP | 2006-17087 | 1/2006 | F04B 27/14 |
| JP | 2006017087 A * | 1/2006 | |
| JP | 2006-52648 | 2/2006 | F04B 27/14 |
| JP | 3783434 | 3/2006 | F04B 27/14 |
| JP | 2007177627 | 7/2007 | F04B 27/14 |
| JP | 4100161 | 6/2008 | F16H 61/00 |
| JP | 2011017381 | 1/2011 | F16H 61/00 |
| JP | 2011-94554 | 5/2011 | F04B 27/14 |
| JP | 2014-80927 | 5/2014 | F04B 27/14 |
| JP | 2014080927 A * | 5/2014 | |
| JP | 2014-126025 | 7/2014 | F04B 27/14 |
| JP | 2015-1168 | 1/2015 | F04B 27/14 |
| JP | 2015-34510 | 2/2015 | F04B 27/14 |
| JP | 2015034510 A * | 2/2015 | F04B 1/295 |
| JP | 201620682 | 2/2016 | F04B 27/14 |
| JP | 5983539 | 8/2016 | F04B 27/18 |
| JP | 2017-31834 | 2/2017 | F04B 27/18 |
| JP | 2018-3884 | 1/2018 | F16K 31/06 |
| JP | 2018003884 A * | 1/2018 | F04B 27/18 |
| JP | 2018179087 | 11/2018 | F16K 31/06 |
| JP | 2019143781 | 8/2019 | F16K 11/07 |
| WO | WO2005095796 | 10/2005 | F04B 27/14 |
| WO | WO2012/077438 | 6/2012 | F04B 27/14 |
| WO | WO-2012077439 A1 * | 6/2012 | B60H 1/00485 |
| WO | WO2015093502 | 6/2015 | F04B 49/80 |
| WO | WO2017057160 | 4/2017 | F04B 27/18 |
| WO | WO-2017057160 A1 * | 4/2017 | |
| WO | WO2018061380 | 4/2018 | F04B 27/18 |
| WO | WO-2018139476 A1 * | 8/2018 | F04B 27/1804 |
| WO | WO2019102909 | 5/2019 | F16K 31/06 |
| WO | WO2013005538 | 1/2023 | F16K 17/06 |

OTHER PUBLICATIONS

Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4 dated Oct. 21, 2022, 11 pages.
European Search Report issued in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.

(56) References Cited

OTHER PUBLICATIONS

European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
Official Action issued in related U.S. Appl. No. 17/599,474, dated Mar. 2, 2023, 11 pages.
Official Action issued in related U.S. Appl. No. 17/599,467, dated Jan. 24, 2023, 11 pages.
Official Action issued in related U.S. Appl. No. 17/599,520, dated Jan. 30, 2023, 8 pages.
Chinese Official Action issued in related Chinese Application Serial No. 202080028782.3 dated Dec. 15, 2022, 10 pages.
Chinese Official Action issued in related Chinese Application Serial No. 202080028860.X dated Nov. 22, 2022, 12 pages.
Chinese Official Action issued in related application serial No. 202080026542.X, dated Mar. 16, 2023, 11 pages with translation.
Chinese Official Action issued in related application serial No. 202080026977.4, dated Apr. 20, 2023, 12 pages with translation.
Korean Official Action issued in related application serial No. 10-2021-7036305, dated Mar. 15, 2023, 8 pages with translation.
Official Action issued in related U.S. Appl. No. 17/603,284, dated May 3, 2023, 10 pages.
Official Action issued in related U.S. Appl. No. 17/599,467, dated May 10, 2023, 12 pages.
Official Action issued in related U.S. Appl. No. 17/603,291, dated May 8, 2023, 9 pages.
Chinese Official Action issued in related application serial No. 202080026542.X, dated Jun. 12, 2023, 11 pages with translation.
Chinese Official Action issued in related application serial No. 202080026542.X, dated Aug. 29, 2023, 13 pages with translation.
Chinese Official Action issued in related application serial No. 202080026977.4, dated Aug. 25, 2023, 17 pages with translation.
Chinese Official Action issued in related application serial No. 202080026419.8, dated May 24, 2023, 10 pages with translation.
European Search Report issued in related application serial No. 23174587.8, dated Sep. 12, 2023, 14 pages.
European Search Report issued in related application serial No. 23180732.2, dated Oct. 18, 2023, 7 pages.
Official Action issued in related U.S. Appl. No. 17/603,284, dated Aug. 21, 2023, 15 pages.
Official Action issued in related U.S. Appl. No. 17/603,291, dated Aug. 22, 2023, 11 pages.
Official Action issued in related U.S. Appl. No. 17/603,291, dated Nov. 6, 2023, 11 pages.
Official Action issued in related U.S. Appl. No. 17/599,474, dated Jun. 27, 2023, 13 pages.
Official Action issued in related U.S. Appl. No. 17/599,474, dated Sep. 29, 2023, 12 pages.
Official Action issued in related U.S. Appl. No. 17/919,731, dated Nov. 9, 2023, 7 pages.
Notice of Allowance issued in related U.S. Appl. No. 17/599,467, dated Aug. 8, 2023, 19 pages.
Chinese Official Action issued in related Application No. 202080026977.4, dated Nov. 16, 2023 with translation, 18 pages.
Chinese Official Action issued in related Application No. 2020080026419.8, dated Dec. 1, 2023 with translation, 17 pages.
European Official Action issued in related Application No. 20795023.9, dated Jan. 30, 2024, 6 pages.
European Official Action issued in related Application No. 21792462.0, dated Feb. 15, 2024, 7 pages.
European Official Action issued in related Application No. 20785209.6, dated Mar. 15, 2024, 6 pages.
European Official Action issued in related Application No. 20868996.8, dated Oct. 2, 2023, 8 pages.
Japanese Official Action issued in related Application No. 2021-516128, dated Dec. 5, 2023 with translation, 8 pages.
Korean Official Action issued in related Application No. 10-2021-7034329, dated Jan. 2, 2024 with translation, 12 pages.
Action issued in related U.S. Appl. No. 17/603,291, dated Feb. 20, 2024, 10 pages.
Action issued in related U.S. Appl. No. 17/255,085, dated Mar. 28, 2024, 8 pages.
Action issued in related U.S. Appl. No. 17/919,731, dated Nov. 9, 2023, 7 pages.
Action issued in related U.S. Appl. No. 17/599,474, dated Dec. 14, 2023, 12 pages.
Action issued in related U.S. Appl. No. 17/603,291, dated Nov. 6, 2023, 11 pages.
Advisory Action issued in related U.S. Appl. No. 17/599,474, dated Mar. 21, 2024, 6 pages.
International Preliminary Report on Patentability issued in PCT International Patent Application Serial No. PCT/JP2020/015177, dated Oct. 14, 2021 with translation (6 pgs).
International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
European Official Action issued in related Application No. 20795975.0, dated May 3, 2024, 6 pages.
Korean Official Action issued in related Application No. 10-2022-7037944, dated Apr. 1, 2024 with translation, 9 pages.
Official Action issued in related U.S. Appl. No. 17/919,731, dated May 3, 2024, 8 pages.
Official Action issued in related U.S. Appl. No. 18/225,085, dated Mar. 28, 2024, 8 pages.
Notice of Allowance issued in related U.S. Appl. No. 17/603,291, dated Apr. 17, 2024, 7 pages.
Notice of Allowance issued in related U.S. Appl. No. 17/603,284, dated Nov. 2, 2023, 9 pages.
Notice of Allowance issued in related U.S. Appl. No. 17/599,474, dated May 1, 2024, 9 pages.
U.S. Appl. No. 17/599,520, filed Sep. 28, 2020, Hayama et al.
U.S. Appl. No. 17/600,529, filed Sep. 30, 2020, Hayama et al.
U.S. Appl. No. 17/599,474, filed Sep. 28, 2020, Hayama et al.
U.S. Appl. No. 17/599,467, filed Sep. 28, 2020, Hayama et al.
U.S. Appl. No. 17/603,291, filed Oct. 12, 2021, Fukudome et al.
U.S. Appl. No. 17/603,284, filed Oct. 12, 2021, Hayama et al.
Official Action issued in related U.S. Appl. No. 17/919,731, dated Aug. 15, 2024, 8 pages.

(56) References Cited

OTHER PUBLICATIONS

Notice of Allowance issued in related U.S. Appl. No. 18/225,085, dated Jul. 17, 2024, 8 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a CS valve provided between a control port through which a control fluid of the control pressure Pc passes and a suction port through which a suction fluid of the suction pressure Ps passes is opened and closed to adjust the control pressure Pc of the control chamber of the variable displacement compressor.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a target cooling ability.

In a capacity control valve of Patent Citation 1, by opening and closing a CS valve to control a fluid of control pressure Pc running from a control chamber of a variable displacement compressor to a suction chamber and bringing a pressure difference between discharge pressure Pd of a discharge chamber and the control pressure Pc of the control chamber respectively applied in the stroke direction of pistons close to a target value, a discharge amount of the fluid discharged from the discharge chamber is changed. A valve opening degree of the CS valve is changed in accordance with electromagnetic force by an electric current applied to a solenoid, and in response to this, the target value of the pressure difference is changed, so that the discharge amount of the fluid discharged from the discharge chamber is changed.

In Patent Citation 1, a pressure sensitive portion having a diaphragm is provided in a pressure sensitive chamber of the capacity control valve, and the valve opening degree of the CS valve is adjusted by changing force of the pressure sensitive portion to move a valve element in accordance with suction pressure Ps. The suction fluid of the suction pressure Ps supplied to the pressure sensitive chamber is guided to the back surface side of the valve element via the valve element and a communication passage formed in a shaft and a plunger forming the solenoid, so that an influence of the suction pressure Ps applied on both the sides in the moving direction of the valve element is cancelled.

CITATION LIST

Patent Literature

Patent Citation 1: JP 2011-94554 A (PAGE 10, FIG. 2)

SUMMARY OF INVENTION

Technical Problem

However, in Patent Citation 1, since the influence of the suction pressure Ps is cancelled, a control property of the CS valve is excellent but at the time of opening the CS valve, a pressure receiving area for the control pressure Pc in the valve element is large on the pressure receiving surface side where the control pressure Pc is applied in the valve opening direction. Thus, the control pressure Pc which is higher than the suction pressure Ps is applied to bias the valve element in the valve opening direction, and there is a problem that responsiveness of the capacity control valve is deteriorated. At the time of opening the CS valve, the fluid of the control pressure sometimes runs round to the back surface side of the valve element, and energy efficiency is poor.

The present invention is achieved focusing on such problems, and an object thereof is to provide a capacity control valve with which responsiveness can be enhanced.

Solution to Problem

In order to solve the foregoing problem, a capacity control valve according to the present invention is a capacity control valve including: a valve housing provided with a suction port through which a suction fluid of suction pressure passes, and a control port through which a control fluid of control pressure passes; a valve element configured to be driven by a solenoid; a spring that biases the valve element in a direction opposite to a driving direction of the solenoid; and a CS valve formed by a CS valve seat and the valve element, the CS valve being configured for opening and closing a communication between the control port and the suction port in accordance with a movement of the valve element, wherein the control pressure is controlled in accordance with opening and closing operation of the CS valve, and the capacity control valve further includes communication control means that controls a communication between the control port and a space on a back surface side of the valve element. According to the aforesaid feature of the present invention, by providing communication between the control port and the back surface side of the valve element by the communication control means and supplying the control fluid of the control pressure to the back surface side of the valve element, it is possible to reduce an influence of the control pressure applied to the valve element. Thus, it is possible to enhance responsiveness with respect to control at the time of high output of a variable displacement compressor. Since the communication control means is to control a communication amount of the fluid in accordance with needs, it is possible to reduce a leakage amount of the control fluid.

It may be preferable that the space on the back surface side of the valve element communicates with the suction port. According to this preferable configuration, it is possible to let the control fluid of the control pressure supplied to the back surface side of the valve element by the communication control means go to the suction port.

It may be preferable that the space on the back surface side of the valve element communicates with the suction port via a throttle. According to this preferable configuration, it is possible to maintain the back surface side of the valve element at pressure which is close to the control pressure.

It may be preferable that a guide hole through which the valve element is inserted is formed in the valve housing on the back surface side of the valve element with respect to the suction port. According to this preferable configuration, it is possible to form the throttle by a clearance formed between the valve element and the guide hole of the valve housing. Thus, a structure of the capacity control valve is simplified.

It may be preferable that the communication control means is configured to provide communication between the control port and the space on the back surface side of the valve element by an electromagnetic force generated in the solenoid. According to this preferable configuration, by providing communication between the control port and the back surface side of the valve element at the time of applying a high electric current to the solenoid, it is possible to reduce the influence of the control pressure applied to the valve element. Thus, it is possible to enhance the responsiveness with respect to the control at the time of high output of the variable displacement compressor.

It may be preferable that the solenoid includes a coil, a plunger, a center post, and a spring arranged between the plunger and the center post, the communication control means is formed by the valve housing in which a through hole passing through in the axial direction is formed, the center post capable of closing an opening end of the through hole, and the plunger, and the center post is be movable toward the plunger by the electromagnetic force generated in the solenoid. According to this preferable configuration, by moving the center post toward the plunger at the time of applying a high electric current to the solenoid, it is possible to open the opening end of the valve housing to provide communication between the control port and the back surface side of the valve element via the through hole. Thus, since it is possible to form the communication control means by utilizing a structure of the solenoid itself, it is possible to simplify the structure of the capacity control valve.

It may be preferable that the center post is pushed onto the valve housing by bias means, and the bias means has larger bias force than the spring. According to this preferable configuration, it is possible to move the center post toward the plunger at the time of applying a high electric current to the solenoid, and to stably operate the plunger and the valve element by the electromagnetic force of the solenoid.

It may be preferable that the communication control means is a control pressure operated valve that controls the communication between the control port and the space on the back surface side of the valve element by bias means arranged in a through hole which passes through the valve housing in the axial direction, and an operated valve element to be biased in a valve closing direction of the control pressure operated valve by the bias means. According to this preferable configuration, when the control pressure is increased, by opening the control pressure operated valve against bias force of the bias means and providing communication between the control port and the back surface side of the valve element, it is possible to reduce the influence of the control pressure applied to the valve element. Thus, it is possible to enhance the responsiveness with respect to the control at the time of high output of the variable displacement compressor.

It may be preferable that a supplementary spring arranged in a control fluid supply chamber which is formed in the valve housing and to which the control fluid is supplied, is provided, the supplementary spring being interlockingly coupled to the valve element. According to this preferable configuration, it is possible to stabilize an action of the valve element.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 8. Hereinafter, description will be given with the left and right sides seen from the front side of FIG. 2 being the left and right sides of the capacity control valve.

A capacity control valve V of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a target cooling ability.

Figure 1:
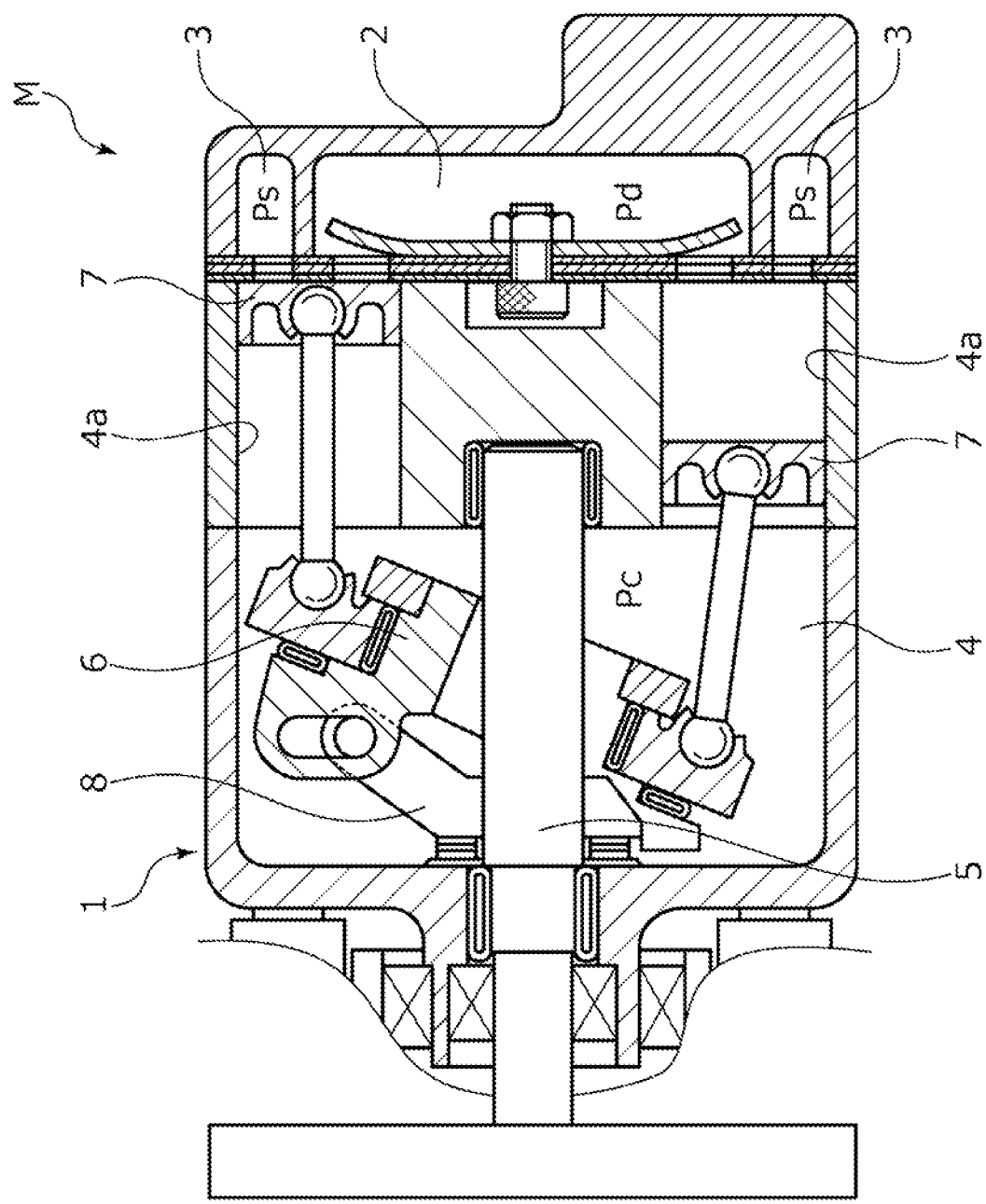
FIG. 1 is a schematic configuration diagram showing a swash plate type variable displacement compressor into which a capacity control valve according to a first embodiment of the present invention is assembled.

First, the variable displacement compressor M will be described. As shown in FIG. 1, the variable displacement compressor M has a casing 1 including a discharge chamber 2, a suction chamber 3, a control chamber 4, and plural cylinders 4a. A communication passage providing direct communication between the discharge chamber 2 and the control chamber 4 is provided in the variable displacement compressor M. A fixed orifice 9 for adjusting and balancing pressure between the discharge chamber 2 and the control chamber 4 is provided in this communication passage (see FIG. 2).

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate 6 is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
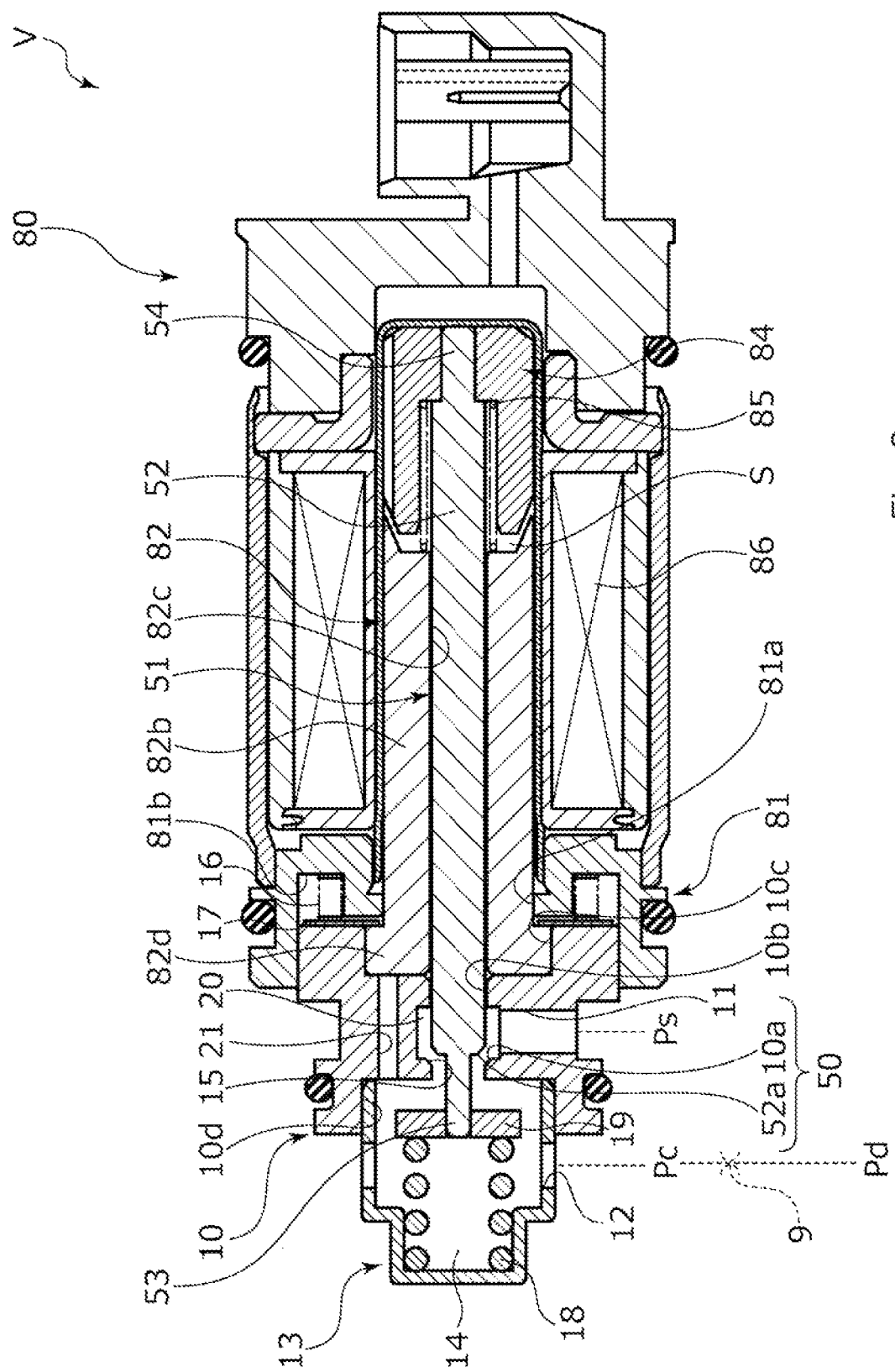
FIG. 2 is a sectional view showing a structure of the capacity control valve according to the first embodiment of the present invention.
Figure 3:
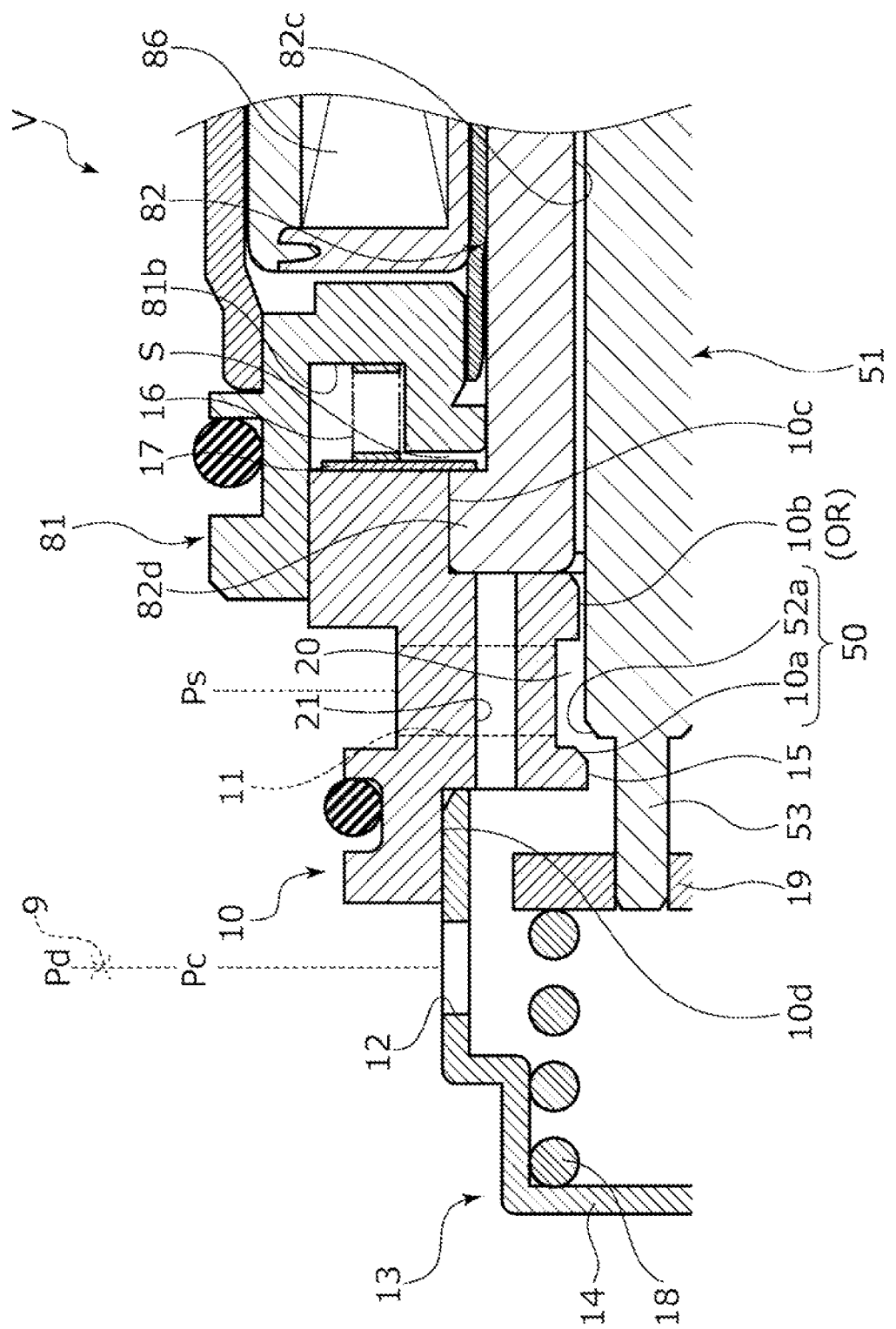
FIG. 3 is a sectional view in which a major part is enlarged, showing a state where a CS valve is opened in a non-energized state of the capacity control valve according to the first embodiment of the present invention.

As shown in FIGS. 2 and 3, the capacity control valve V assembled into the variable displacement compressor M adjusts an electric current energized in a coil 86 forming a solenoid 80 and performs open/close control of a CS valve 50 in the capacity control valve V, so that by controlling the fluid flowing out to the suction chamber 3 from the control chamber 4, the control pressure Pc in the control chamber 4 is variably controlled. A discharge fluid of the discharge pressure Pd of the discharge chamber 2 is always supplied to the control chamber 4 via the fixed orifice 9, and the control pressure Pc in the control chamber 4 is increased by closing the CS valve 50 in the capacity control valve V.

In the present embodiment, the CS valve 50 is formed by a CS valve element 51 serving as a valve element and a CS valve seat 10a formed on an inner peripheral surface of a valve housing 10. By bringing and separating an axially left end 52a of a large diameter portion 52 of the CS valve element 51 into contact with and from the CS valve seat 10a, the CS valve 50 is opened and closed.

Next, a structure of the capacity control valve V will be described. As shown in FIGS. 2 and 3, the capacity control valve V is mainly formed by the valve housing 10 made of a metal material or a resin material, the CS valve element 51 whose axially left end portion is arranged in the valve housing 10, and the solenoid 80 connected to the valve housing 10, the solenoid that applies drive force to the CS valve element 51.

As shown in FIGS. 2 and 3, the CS valve element 51 is formed by the large diameter portion 52 which is a pillar-shaped body having a constant section, a small diameter portion 53 having a smaller diameter than the large diameter portion 52 and extending on the axially left side, and a small diameter portion 54 having a smaller diameter than the large diameter portion 52 and extending on the axially right side, and also serves as a rod arranged to pass through the coil 86 of the solenoid 80.

As shown in FIGS. 2 and 3, in the valve housing 10, a Ps port 11 serving as a suction port which passes through in the radial direction and communicates with the suction chamber 3 of the variable displacement compressor M is formed. On the radially inner side of an axially left end of the valve housing 10, a recessed portion 10d recessed to the axially right side is formed, and by inserting a case body 13 into the recessed portion 10d from the axially left side, integrally connected and fixed in a substantially sealed state. A Pc port 12 serving as a control port which communicates with the control chamber 4 of the variable displacement compressor M is formed in this case body 13, and the inside of the case body 13 serves as a control fluid supply chamber 14 to which a control fluid is supplied via the Pc port 12.

In an axially left end portion of the case body 13, an axially left end of a supplementary spring 18 that biases in the axial direction is secured, and in an axially right end of the supplementary spring 18, a ring member 19 to which the small diameter portion 53 of the CS valve element 51 is inserted and fixed is secured.

Inside the valve housing 10, a valve chamber 20 is formed. In the valve chamber 20, the axially left end 52a of the large diameter portion 52 of the CS valve element 51 is arranged reciprocatably in the axial direction. The Ps port 11 extends in the radially inward direction from an outer peripheral surface of the valve housing 10, and communicates with the valve chamber 20. The Pc port 12 communicates with the valve chamber 20 via the control fluid supply chamber 14 and a communication passage 15 to be described later.

On the inner peripheral surface of the valve housing 10, the CS valve seat 10a is formed at an opening end edge of the communication passage 15 on the valve chamber 20 side, the communication passage providing communication between the control fluid supply chamber 14 and the valve chamber 20. On the inner peripheral surface of the valve housing 10, a guide hole 10b with which an outer peripheral surface of the CS valve element 51 is slidable is formed on the solenoid 80 side of the CS valve seat 10a and the valve chamber 20. That is, in the valve housing 10, the CS valve seat 10a and the guide hole 10b are integrally formed on the inner peripheral surface. Between an inner peripheral surface of the guide hole 10b and the outer peripheral surface of the CS valve element 51, a minute gap is formed by slightly separating in the radial direction. The CS valve element 51 is smoothly movable with respect to the valve housing 10 in the axial direction.

In the valve housing 10, a recessed portion 10c in which the radially inner side of an axially right end is recessed to the axially left side is formed, and integrally connected by inserting a flange portion 82d of a center post 82 from the axially right side and further fixing a casing 81 from the axially right side. On the radially inner side of a bottom surface of the recessed portion 10c of the valve housing 10, an opening end of the guide hole 10b on the solenoid 80 side is formed.

In the valve housing 10, a through hole 21 extending in the axial direction is formed between bottom portions of the recessed portions 10c, 10d in both axial ends. The valve housing 10 is formed to be capable of providing communication between the control fluid supply chamber 14 and a space S inside the casing 81 of the solenoid 80, for example, at the time of applying a high electric current. The space S inside the casing 81 communicates with a space in the center post 82.

As shown in FIGS. 2 and 3, the solenoid 80 is mainly formed by the casing 81 having an opening portion 81a which is open on the axially left side, the substantially cylindrical center post 82 inserted into the opening portion 81a of the casing 81 from the axially left side and arranged between the radially inner side of the casing 81 and the radially inner side of the valve housing 10, the CS valve element 51 inserted into the center post 82 reciprocatably in the axial direction, the CS valve element whose axially left end portion is arranged in the valve housing 10, a movable iron core 84 serving as a plunger to which an axially right end portion of the CS valve element 51 is inserted and fixed, a coil spring 85 provided between the center post 82 and the movable iron core 84, the coil spring serving as a spring that biases the movable iron core 84 to the axially right side which is the valve opening direction of the CS valve 50, and the excitation coil 86 wound on the outside of the center post 82 via a bobbin.

A recessed portion 81b in which the radially inner side of an axially left end is recessed to the axially right side is formed in the casing 81, and a wave spring 16 serving as bias means that biases in the axial direction is arranged in this recessed portion 81b. An annular plate 17 made of a rigid material such as metal is fixed to an axially left end of the wave spring 16, and the radially inner side of the annular plate 17 extends to the flange portion 82d of the center post 82. Preferably, regarding the center post 82, the flange portion 82d is sandwiched by the annular plate 17 and the bottom portion of the recessed portion 10c of the valve housing 10 in a substantially sealed manner in the axial direction.

The wave spring 16 has a higher spring constant than the coil spring 85. Specifically, the wave spring 16 is a spring having a higher spring constant K16 than a spring constant K85 of the coil spring 85 (K16>K85).

The center post 82 is formed by a rigid body which is a magnetic material such as iron or silicon steel, and includes a cylindrical portion 82b extending in the axial direction, the cylindrical portion where an insertion hole 82c into which the CS valve element 51 is inserted is formed, and the annular flange portion 82d extending in the radially outward direction from an outer peripheral surface of an axially left end portion of the cylindrical portion 82b.

Next, actions of the capacity control valve V, mainly actions of opening and closing the CS valve 50 will be described.

First, a non-energized state of the capacity control valve V will be described. As shown in FIGS. 2 and 3, in the capacity control valve V, in a non-energized state, by pressing the movable iron core 84 to the axially right side by bias force of the coil spring 85 and bias force of the supplementary spring 18, the CS valve element 51 is moved to the axially right side and the axially left end 52a of the large diameter portion 52 of the CS valve element 51 is separated from the CS valve seat 10a, and the CS valve 50 is opened.

At this time, to the CS valve element 51, the bias force $F_{sp1}$ of the coil spring 85, the bias force $F_{sp2}$ of the supplementary spring 18, and force $F_{P1}$ by pressure of the fluid to an axially left end surface of the CS valve element 51 are applied to the axially right side, and force $F_{P2}$ by pressure of the fluid to an axially right end surface of the CS valve element 51 is applied to the axially left side. That is, given that the right side is the positive side, force $F_{rod}=F_{sp1}+F_{sp2}+F_{P1}-F_{P2}$ is applied to the CS valve element 51. At the time of opening the CS valve 50, the force $F_{P1}$ by the pressure of the fluid to the axially left end surface of the CS valve element 51 is force by the control pressure Pc in the control fluid supply chamber 14 applied to an axially left end of the small diameter portion 53 of the CS valve element 51 and force by pressure of the fluid in the valve chamber 20 applied to the axially left end 52a of the large diameter portion 52 of the CS valve element 51. Meanwhile, the force $F_{P2}$ by the pressure of the fluid to the axially right end surface of the CS valve element 51 is force by pressure of the fluid running round from the valve chamber 20 to the back surface side of the CS valve element 51 via the gap between the inner peripheral surface of the guide hole 10b of the valve housing 10 and the outer peripheral surface of the CS valve element 51, that is, the fluid existing in the space S of the casing 81. The force $F_{P1}$ by the pressure of the fluid to the axially left end surface of this CS valve element 51 is higher than the force $F_{P2}$ by the pressure of the fluid to the axially right end surface of the CS valve element 51 (i.e., $F_{P1}>F_{P2}$).

Figure 4:
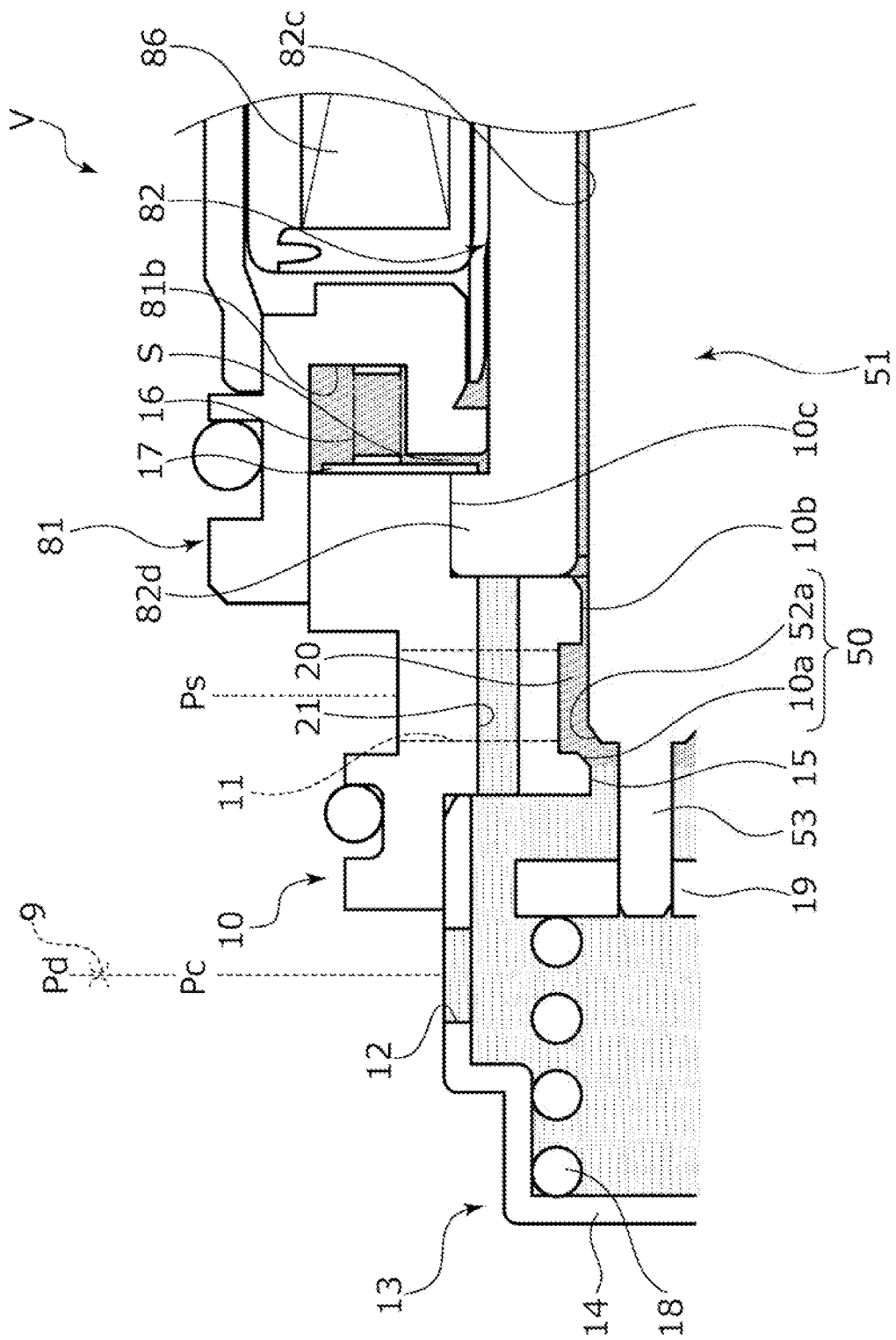
FIG. 4 is a sectional view showing pressure distribution in FIG. 3. In order to show the pressure distribution, sections of members are not shown in the figure.

As shown in FIG. 4, in a non-energized state of the capacity control valve V, the bias force $F_{sp3}$ of the wave spring 16 and the force $F_{P2}$ by the pressure of the fluid to the axially right end surface of the CS valve element 51 are applied to the annular plate 17. By the bias force $F_{sp3}$ of the wave spring 16 and the force $F_{P2}$ by the pressure of the fluid to the axially right end surface of the CS valve element 51, the center post 82 is pushed onto the valve housing 10, and by this center post 82, an opening end 21a on the axially right side of the through hole 21 of the valve housing 10 (see FIG. 5) is closed in a substantially sealed manner. FIG. 4 shows pressure distribution immediately after an energized state is turned into a non-energized state by dots, and it is needless to say that the pressure in the capacity control valve V becomes uniform over time.

Figure 7:
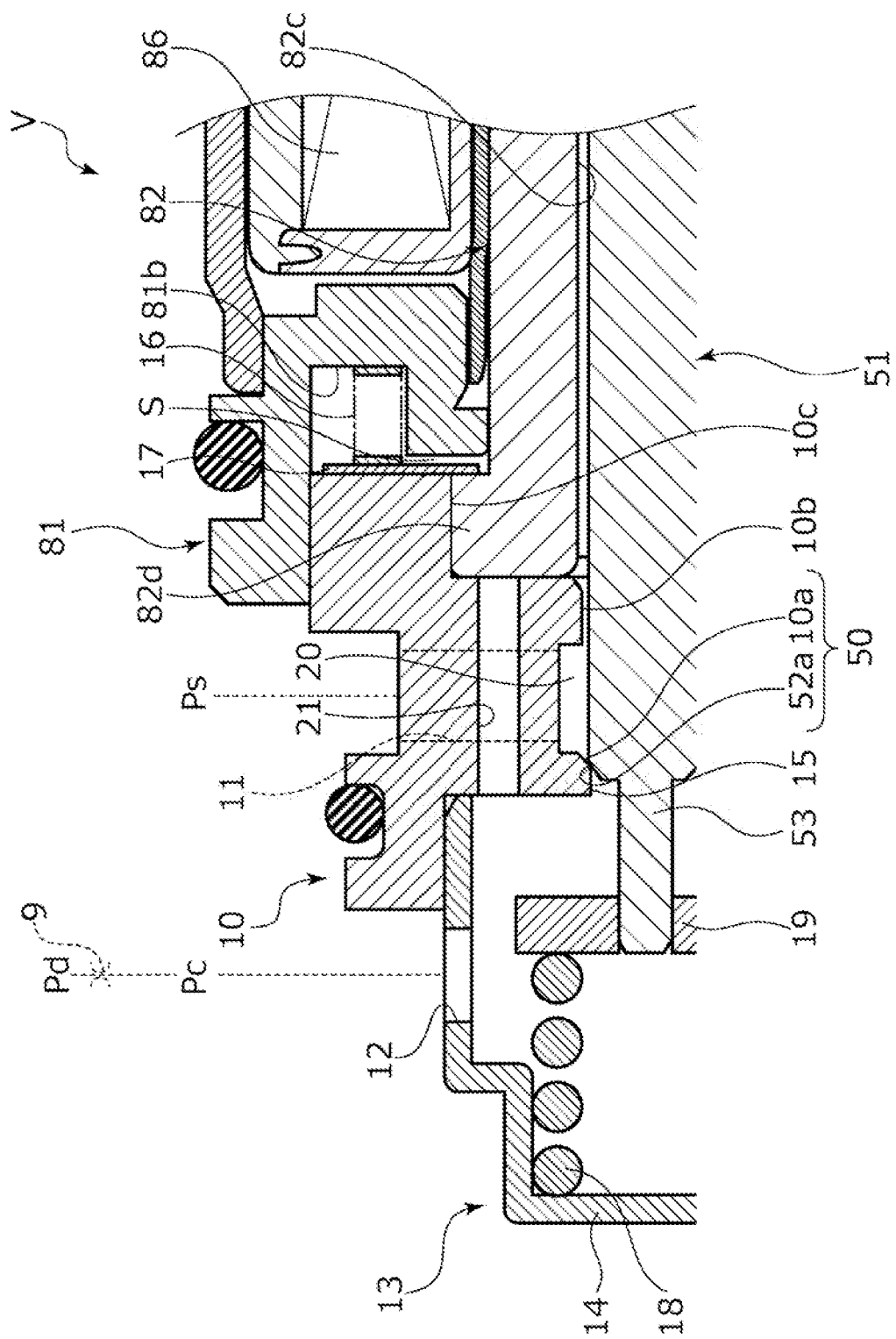
FIG. 7 is a sectional view in which a major part is enlarged, showing a state where the CS valve in the first embodiment of the present invention is closed.

Next, an energized state of the capacity control valve V will be schematically described with reference to FIG. 7. As shown in FIG. 7, in the capacity control valve V, in an energized state, that is, at the time of normal control, at the time of so-called duty control, when electromagnetic force $F_{sol}$ generated by applying an electric current to the solenoid 80 exceeds the force $F_{rod}$ (i.e., $F_{sol}>F_{rod}$), by pulling the movable iron core 84 to the axially left side, that is, toward the center post 82, and moving the CS valve element 51 fixed to the movable iron core 84 to the axially left side together, the axially left end 52a of the CS valve element 51 is seated on the CS valve seat 10a of the valve housing 10, and the CS valve 50 is closed.

At this time, to the CS valve element 51, the electromagnetic force $F_{sol}$ is applied on the axially left side, and the force $F_{rod}$ is applied on the axially right side. That is, given that the right side is the positive side, force $F_{rod}-F_{sol}$ is applied to the CS valve element 51. At the time of closing the CS valve 50, the force $F_{P1}$ by the pressure of the fluid to the axially left end surface of the CS valve element 51 is the force by the control pressure Pc of the control fluid of the Pc port 12.

Next, a fully-opened state of the CS valve 50 in a case where the control pressure Pc is high or a case where the control pressure Pc is to be radially increased, that is, a state before a non-energized state of the capacity control valve V is turned into a fully-closed state of the CS valve 50 will be described. Hereinafter, for convenience of description, the force $F_{P1}$ by the pressure of the fluid to the axially left end surface of the CS valve element 51 will be called as the force $F_{P1}$ by the pressure of the fluid in the control fluid supply chamber 14 and the valve chamber 20, and the force $F_{P2}$ by the pressure of the fluid to the axially right end surface of the CS valve element 51 will be called as the force $F_{P2}$ by the pressure of the fluid in the space S.

In a fully-opened state of the CS valve 50, when the control pressure Pc is high, force generated by a pressure difference between the force $F_{P1}$ by the pressure of the fluid in the control fluid supply chamber 14 and the valve chamber 20 and the force $F_{P2}$ by the pressure of the fluid in the space S is increased, and the force $F_{P1}$ by the pressure of the fluid in the control fluid supply chamber 14 and the valve chamber 20 is largely applied to the CS valve element 51 to bias to the axially right side, that is, in the valve opening direction. Thus, in order to move the CS valve element 51 to the axially left side, a large electric current to be applied is required. Even in a case where the control pressure Pc is to be radially lowered, in order to move the CS valve element 51 to the axially left side, a large electric current to be applied is also required.

Figure 5:
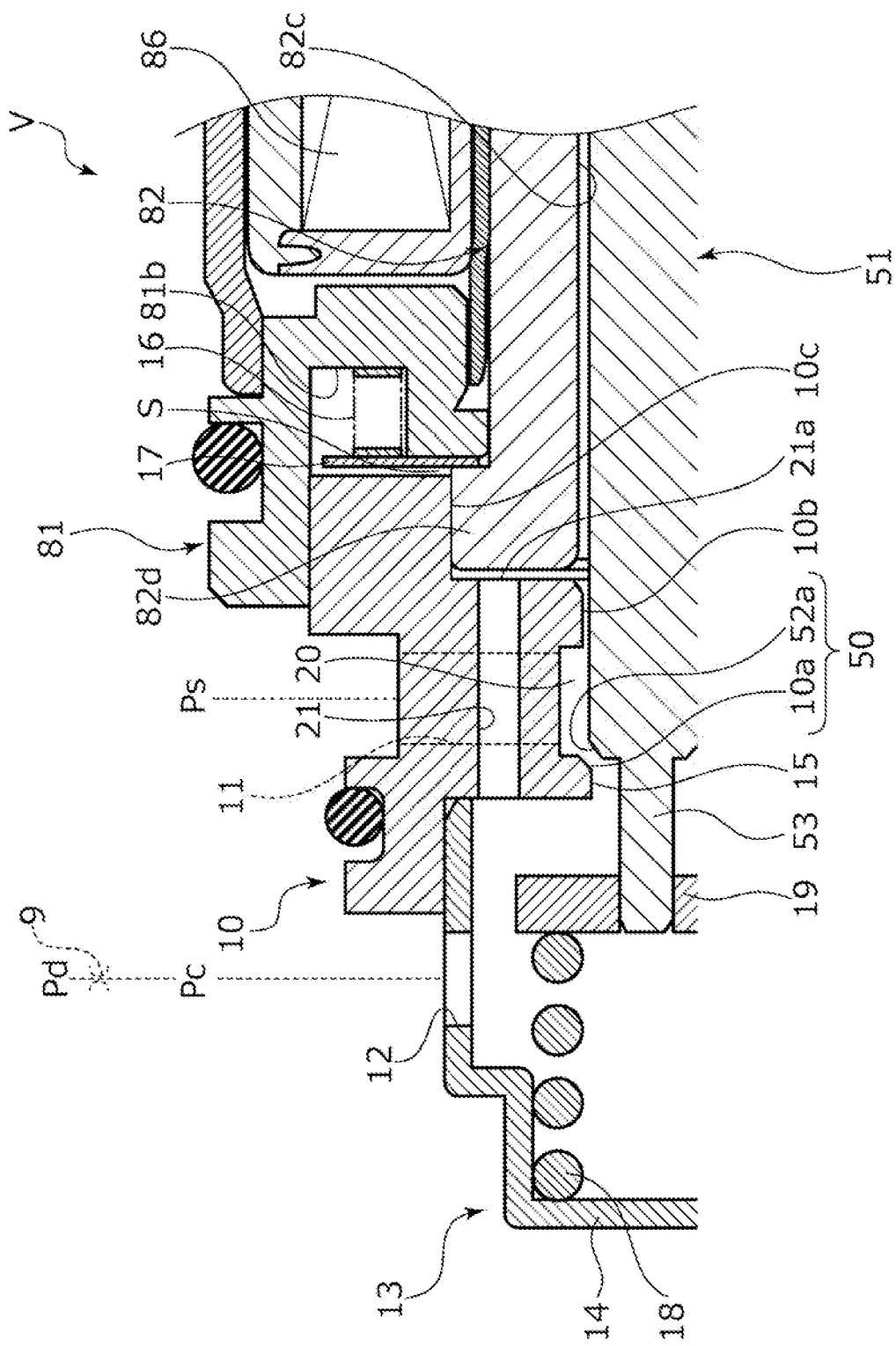
FIG. 5 is a sectional view in which a major part is enlarged, showing a state at the time of applying a high electric current to a solenoid in a case where control pressure in the first embodiment of the present invention is high.
Figure 6:
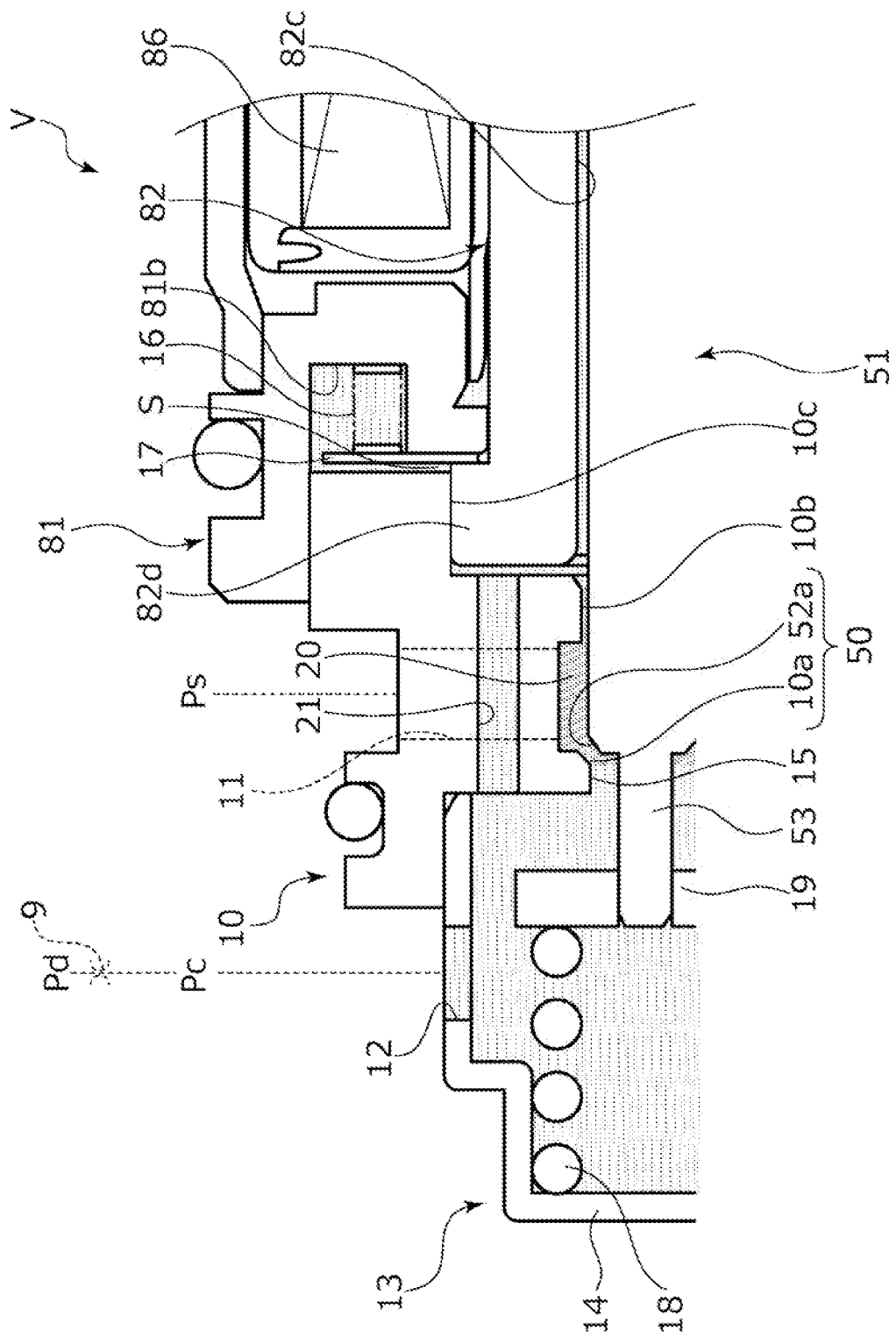
FIG. 6 is a view showing pressure distribution in FIG. 5. In order to show the pressure distribution, the sections of the members are not shown in the figure.

As shown in FIGS. 5 and 6, when a large electric current is applied to the solenoid 80, that is, at the time of applying a high electric current to the solenoid 80, large electromagnetic force $F_{sol}$ that pulls the center post 82 and the movable iron core 84 to each other is generated between the center post 82 and the movable iron core 84. When this electromagnetic force $F_{sol}$ exceeds the bias force $F_{sp3}$ of the wave spring 16 and the force $F_{P2}$ by the pressure of the fluid existing in the space S of the casing 81 (i.e., $F_{sol}>F_{sp3}+F_{P2}$), the center post 82 is moved to the axially right side by the electromagnetic force $F_{sol}$, and a gap is formed between the bottom portion of the recessed portion 10c of the valve housing 10 and an axially left end of the center post 82.

Thereby, the control fluid supply chamber 14 and the space S of the casing 81 communicate with each other via the through hole 21, the fluid is supplied from the control fluid supply chamber 14 into the space S of the casing 81 through the through hole 21, and the force generated by the pressure difference between the force $F_{P1}$ by the pressure of the fluid in the control fluid supply chamber 14 and the valve chamber 20 and the force $F_{P2}$ by the pressure of the fluid in the space S is reduced. In such a way, the opening end 21a on the axially right side of the through hole 21, the center post 82, and the movable iron core 84 function as communication control means that control communication between the Pc port 12 and the back surface side of the CS valve element 51.

Figure 8:
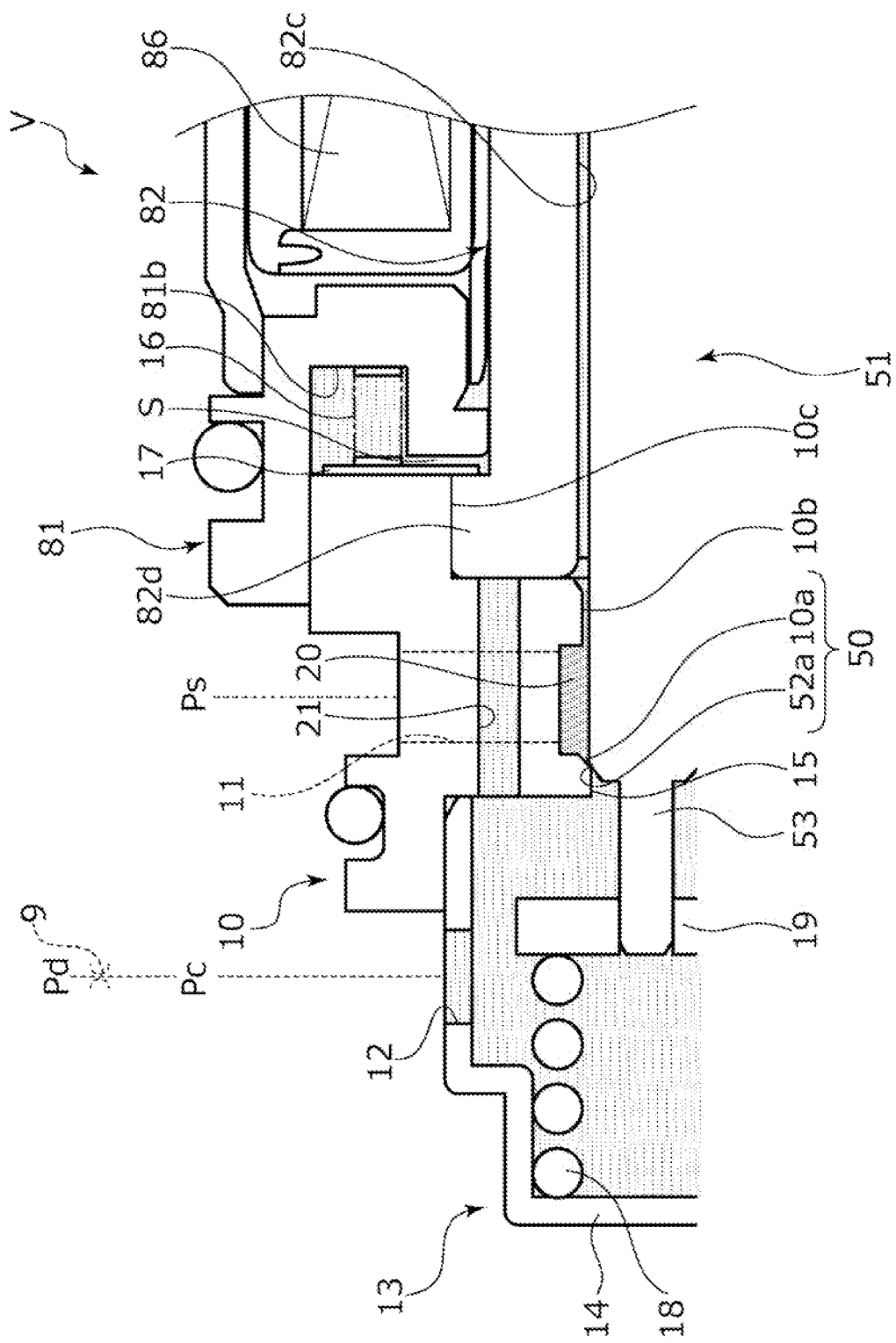
FIG. 8 is a view showing pressure distribution in FIG. 7. In order to show the pressure distribution, the sections of the members are not shown in the figure.

When the force generated by the pressure difference between the force $F_{P1}$ by the pressure of the fluid in the control fluid supply chamber 14 and the valve chamber 20 and the force $F_{P2}$ by the pressure of the fluid in the space S is reduced, and since, as described above, the wave spring 16 is the spring having the higher spring constant K16 than the spring constant K85 of the coil spring 85 (i.e., K16>K85), the bias force $F_{sp3}$ of the wave spring 16 is dominantly applied. As shown in FIGS. 7 and 8, the center post 82 is pushed back to the axially left side, the coil spring 85 is contracted, the movable iron core 84 and the CS valve element 51 are moved to the axially left side together, the axially left end 52a of the large diameter portion 52 of the CS valve element 51 is seated on the CS valve seat 10a, and the CS valve 50 is closed. Since the force generated by the pressure difference between the force $F_{P1}$ by the pressure of the fluid in the control fluid supply chamber 14 and the valve chamber 20 and the force $F_{P2}$ by the pressure of the fluid in the space S is small, an influence on the CS valve element 51 by the force $F_{P1}$ by the pressure of the fluid in the control fluid supply chamber 14 and the valve chamber 20 is reduced, and it is possible to smoothly operate the CS valve element 51 to the axially left side, that is, in the valve closing direction.

According to this, by moving the center post 82 in the axial direction, it is possible to provide communication between the Pc port 12 and the back surface side of the CS valve element 51, that is, the space S of the casing 81, supply the control fluid in the control fluid supply chamber 14 to the back surface side of the CS valve element 51, and reduce an influence of the pressure of the fluid applied in the valve opening direction of the CS valve element 51. Thus, it is possible to smoothly operate the CS valve element 51 in the valve closing direction, and enhance responsiveness with respect to control at the time of high output of the variable displacement compressor M.

The center post 82 is operated to open the through hole 21 in accordance with the pressure difference between the pressure of the fluid in the space S and the pressure of the fluid in the valve chamber 20. Thus, it is possible to supply the control fluid in the control fluid supply chamber 14 into the space S of the casing 81 in accordance with needs, and adjust an opening degree of the CS valve 50 with high precision. In other words, when a pressure difference between the control pressure and the suction pressure is small, the force generated by the pressure difference applied to the CS valve element 51 is permitted. Meanwhile, in a case where the pressure difference between the control pressure and the suction pressure is large, it is possible to cancel the force generated by the pressure difference applied to the CS valve element 51. Thus, it is possible to obtain both control precision of the CS valve element 51 and reduction in a leakage amount of the fluid.

The space S of the casing 81 communicates with the Ps port 11, and it is possible to let the control fluid in the control fluid supply chamber 14 supplied to the space S of the casing 81 through the through hole 21 go to the Ps port 11. In such a way, it is possible to let the fluid go by utilizing the existing Ps port 11. Thus, it is possible to simplify the structure of the capacity control valve V.

The space S of the casing 81 communicates the Ps port 11 via a throttle. Specifically, the minute gap between the inner peripheral surface of the guide hole 10b and the outer peripheral surface of the CS valve element 51 functions as a throttle OR. It is possible to let the fluid in the space S of the casing 81 slowly go to the Ps port 11, and maintain a state where the pressure difference between the pressure of the fluid in the valve chamber 20 and the pressure of the fluid in the space S of the casing 81 is small.

The minute gap between the inner peripheral surface of the guide hole 10b and the outer peripheral surface of the CS valve element 51 is utilized as the throttle OR. Thus, there is no need for preparing a different member as a throttle, and it is possible to simplify the structure of the capacity control valve V.

By the electromagnetic force generated between the center post 82 and the movable iron core 84 at the time of applying a high electric current to the solenoid 80, the center post 82 is moved to the movable iron core 84 side, and the opening end 21a of the through hole 21 is opened, so that the control fluid supply chamber 14 and the space S of the casing 81 communicate with each other. Thus, it is possible to form the communication control means by utilizing a structure of the solenoid 80 itself, and simplify the structure of the capacity control valve V.

The center post 82 is pushed onto the valve housing 10 by the wave spring 16, and the bias force of the wave spring 16 is larger than the coil spring 85. Thus, it is possible to move the center post 82 toward the movable iron core 84 at the time of applying a high electric current to the solenoid 80. At the time of applying a low electric current to the solenoid 80, or when unintended external force to the axially right side is applied to the center post 82, it is possible to inhibit the center post 82 from moving.

The CS valve element 51 is biased in the axial direction by the coil spring 85 and the supplementary spring 18 on both the sides in the axial direction. Thus, an action of the CS valve element 51 in the axial direction is stabilized. Before the case body 13 is fixed to the valve housing 10, it is possible to adjust the bias force of the supplementary spring 18 applied to the CS valve element 51. When one of the coil spring 85 and the supplementary spring 18 is provided, the other configuration may be omitted.

The CS valve seat 10a and the guide hole 10b are integrally formed in the valve housing 10. Thus, it is possible to enhance precision of an action of the CS valve element 51.

In the present embodiment, the example in which the annular plate 17 has rigidity so that the annular plate is hardly deformed at the time of moving the center post 82 is described. However, the annular plate may have elasticity so that the annular plate is curved at the time of moving the center post 82.

As long as the wave spring 16 can be brought into direct contact with the center post 82, the configuration of the annular plate 17 may be omitted.

Second Embodiment

Figure 9:
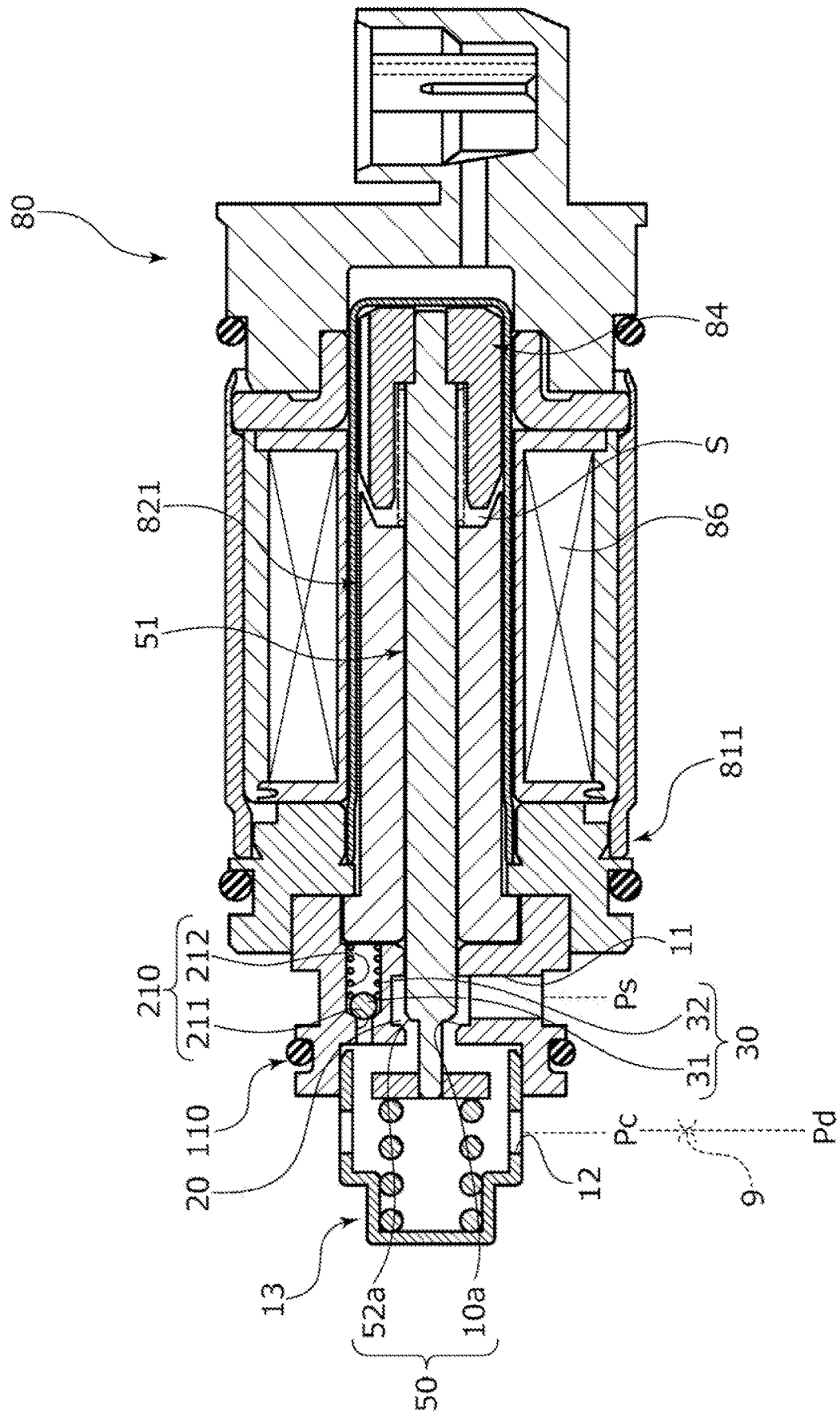
FIG. 9 is a sectional view showing a structure of a capacity control valve according to a second embodiment of the present invention.
Figure 10:
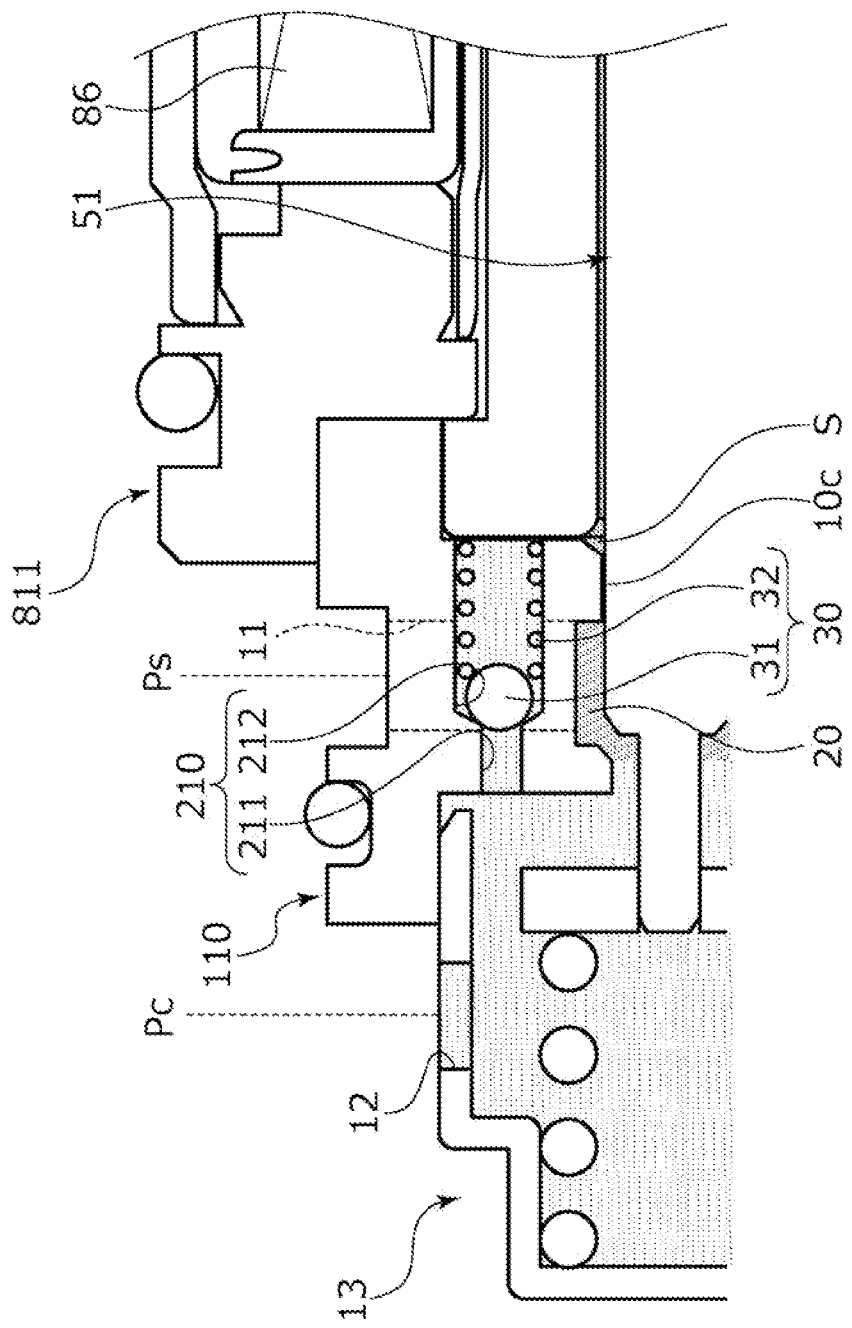
FIG. 10 is a view showing pressure distribution in a state where a CS valve is opened in a non-energized state of the capacity control valve according to the second embodiment of the present invention. In order to show the pressure distribution, sections of members are not shown in the figure.

A capacity control valve according to a second embodiment of the present invention will be described with reference to FIGS. 9 to 11. Duplicated description for the same configurations as the first embodiment is omitted. FIGS. 9 and 10 show states where control pressure Pc in a control fluid supply chamber 14 is low, and FIG. 11 shows a state where the control pressure Pc in the control fluid supply chamber 14 is high.

Figure 11:
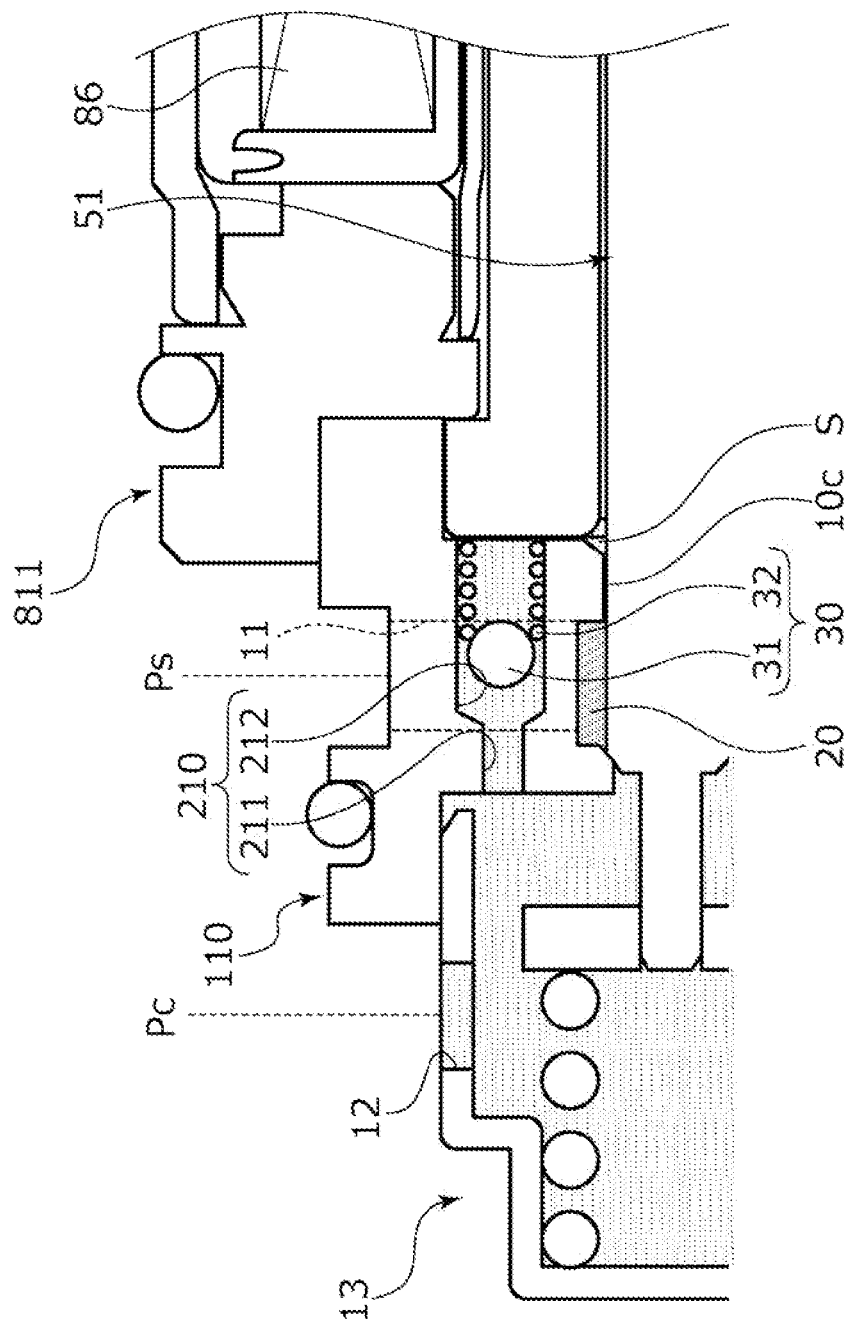
FIG. 11 is a view showing pressure distribution in a state where the CS valve in the second embodiment of the present invention is closed. In order to show the pressure distribution, the sections of the members are not shown in the figure.

As shown in FIGS. 9 to 11, in the second embodiment of the present embodiment, a through hole 210 formed in a valve housing 110 is formed by a small diameter hole portion 211 whose axial left end communicates with the control fluid supply chamber 14, and a large diameter hole portion 212 continuing from an axial right end of the small diameter hole portion 211 and having a larger diameter than the small diameter hole portion 211. An axial right end of the large diameter hole portion 212 is closed in a substantially sealed manner by a center post 821 sandwiched by the valve housing 110 and a casing 811 in the axial direction and fixed in a substantially sealed manner. In the present embodiment, the center post 821 may be fixed to the valve housing 110 or the casing 811 by bonding or welding.

In the large diameter hole portion 212 of the through hole 210, a ball-shaped operated valve element 31, and a return spring 32 serving as bias means whose axial right end is fixed to the center post 82 and whose axial left end is abutted with the operated valve element 31 are arranged. The operated valve element 31 and the return spring 32 form a control pressure operated valve 30 that controls communication between the control fluid supply chamber 14 and a space S of the casing 811.

As shown in FIG. 10, in a state where the control pressure Pc in the control fluid supply chamber 14 is low, by biasing the operated valve element 31 to the axially left side by the return spring 32 and seating on an opening end of the small diameter hole portion 211 of the through hole 210, the control pressure operated valve 30 is closed and the control fluid supply chamber 14 and the space S inside the casing 811 are brought into a non-communication state.

At this time, force $F_{P11}$ by the control pressure Pc in the control fluid supply chamber 14 is applied to the axially right side, and bias force $F_{sp11}$ of the return spring 32 and force $F_{P12}$ by pressure of the fluid in the space S are applied to the axially left side (i.e., $F_{P11} < F_{sp11} + F_{P12}$).

As shown in FIG. 11, in a state where the control pressure Pc in the control fluid supply chamber 14 is high, by moving the operated valve element 31 to the axially right side against the bias force of the return spring 32 and the force $F_{P12}$ by the pressure of the fluid in the space S, the control pressure operated valve 30 is opened, and the control fluid supply chamber 14 and the space S inside the casing 811 are brought into a communication state.

At this time, to the operated valve element 31, the force $F_{P11}$ by the control pressure Pc in the control fluid supply chamber 14, the force exceeding the bias force $F_{sp11}$ of the return spring 32 and the force $F_{P12}$ by the pressure of the fluid in the space S is applied to the axially right side (i.e., $F_{P11} > F_{sp11} + F_{P12}$).

As in the state of FIG. 11, when the control pressure operated valve 30 is opened and the control fluid supply chamber 14 and the space S of the casing 811 are brought into a communication state, a pressure difference of the fluid between the control fluid supply chamber 14 and the space S of the casing 811 is reduced. Thus, an influence on a CS valve element 51 by force $F_{P1}$ by pressure of the fluid in the control fluid supply chamber 14 and a valve chamber 20 is reduced, and it is possible to smoothly operate the CS valve element 51 to the axially left side, that is, in the valve closing direction.

In such a way, when the control pressure Pc in the control fluid supply chamber 14 is increased, by operating the operated valve element 31 against the bias force of the return spring 32 and opening the control pressure operated valve 30 so as to provide communication between a Pc port 12 and the space S of the casing 811, it is possible to reduce the influence of the pressure of the fluid in the valve chamber 20 applied to the CS valve element 51. Thus, it is possible to enhance responsiveness with respect to control at the time of high output of a variable displacement compressor M.

It is possible to let the fluid in the space S of the casing 811 slowly go to a Ps port 11 from a minute gap between an inner peripheral surface of a guide hole 10*b* and an outer peripheral surface of the CS valve element 51. Thus, it is possible to maintain a state where the control pressure operated valve 30 is opened. Specifically, it is possible to avoid that the pressure of the fluid in the space S of the casing 811 is radically increased and the control pressure operated valve 30 is immediately closed.

Figure 12:
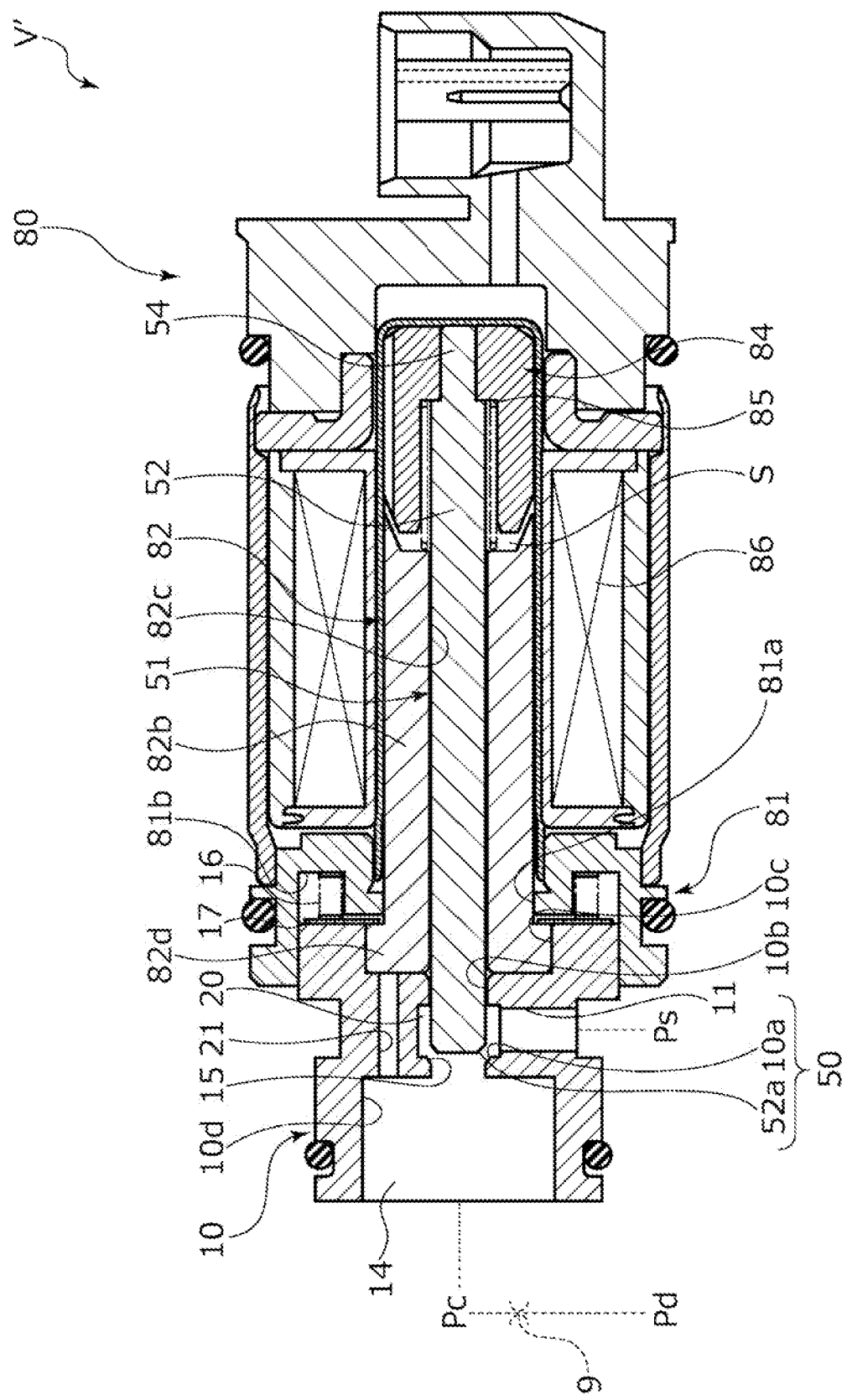
FIG. 12 is a sectional view showing a modified example of the capacity control valve according to the first embodiment of the present invention.

Next, a modified example of the capacity control valve according to the first embodiment of the present invention will be described. As in a capacity control valve V' of the present modified example shown in FIG. 12, the configurations of the case body 13, the supplementary spring 18, and the ring member 19 of the first embodiment may be omitted. In this case, the recessed portion 10*d* of the valve housing 10 also serves as the Pc port and the control fluid supply chamber 14. In such a way, even when the configurations of the case body 13, the supplementary spring 18, and the ring member 19 are omitted, it is possible to bias the CS valve element 51 to the axially right side by a coil spring 85.

The embodiments of the present invention are described above with the drawings. However, specific configurations are not limited to these embodiments but the present invention includes changes and additions within the range not departing from the scope of the present invention.

For example, the first and second embodiments describe the mode that the Ps port 11 communicates with the space S which is the back surface side of the CS valve element 51 via the throttle OR which is the minute gap between the inner peripheral surface of the guide hole 10*b* and the outer peripheral surface of the CS valve element 51. However, the present invention is not limited to this but the back surface side of the CS valve element 51 and the Ps port 11 may communicate with each other with a large opening, and a throttle member such as an orifice may be provided in the opening. Communication may be provided by not providing a throttle between the back surface side of the CS valve element 51 and the Ps port 11 but with a large opening.

The first embodiment describes the mode that the control fluid supply chamber 14 and the space S communicate with each other by operating the center post 82 by the electromagnetic force of the solenoid 80. However, the present invention is not limited to this but the control fluid supply chamber 14 and the space S may communicate with each other by operating a member different from the center post 82 by the electromagnetic force of the solenoid.

The first and second embodiments describe the mode that the CS valve element also serves as the rod arranged to pass through the coil 86 of the solenoid 80. However, the present invention is not limited to this but the CS valve element may be formed reciprocatably in the axial direction together with a separate rod.

The first and second embodiments describe that the CS valve seat and the guide hole are integrally formed on the inner peripheral surface of the valve housing. However, the present invention is not limited to this but a valve housing having a CS valve seat and a valve housing having a guide hole may be separately provided.

A guide portion is not limited to be formed in the valve housing but may be formed in part of the insertion hole 82*c* of the center post 82, for example.

REFERENCE SIGNS LIST

1 Casing
2 Discharge chamber
3 Suction chamber
4 Control chamber
5 Valve housing
10*a* CS valve seat
11 Ps port
12 Pc port
13 Case body
14 Control fluid supply chamber
16 Wave spring (bias means)
18 Supplementary spring
20 Valve chamber
21 Through hole (communication control means)
21*a* Opening end
30 Control pressure operated valve
31 Operated valve element
32 Return spring (bias means)
50 CS valve
51 CS valve element (valve element)
80 Solenoid
81 Casing
82 Center post (communication control means)
84 Movable iron core (communication control means, plunger)
85 Coil spring (spring)
110 Valve housing
210 Through hole (communication control means)
M Variable displacement compressor
OR Throttle
Pc Control pressure
Pd Discharge pressure
Ps Suction pressure
S Space
V Capacity control valve

The invention claimed is:

1. A capacity control valve comprising:
a valve housing provided with a suction port through which a suction fluid of suction pressure passes, and a control port through which a control fluid of control pressure passes;
a valve element configured to be driven by a solenoid;
a first spring that biases the valve element in a direction opposite to a driving direction of the solenoid; and
a control-suction valve formed by a control-suction valve seat provided on an inner peripheral surface of the valve housing and the valve element, the control-suction valve being configured for opening and closing a communication passage between the control port and the suction port by causing the valve element to separate from and come into contact with the control-suction valve seat, wherein
the control pressure is controlled in accordance with opening and closing operation of the control-suction valve,
a space configured for communicating with the control port is formed inside the valve housing and arranged on a back surface side of the valve element, the valve element has a contact portion which is capable of coming into contact with the control-suction valve seat and which is housed in a valve chamber communicating with the suction port, the valve chamber is formed by a single continuous space, the control-suction valve seat is provided so as to face the valve chamber, the control pressure of the control fluid acts on the valve element through the communication passage which provides a communication between the valve chamber and a control fluid supply chamber communicating with the control port, and a supplemental spring is arranged in the control fluid supply chamber and interlockingly coupled to the valve element.

2. The capacity control valve according to claim 1, wherein the space on the back surface side of the valve element communicates with the suction port.

3. The capacity control valve according to claim 2, wherein the space on the back surface side of the valve element communicates with the suction port via a throttle.

4. The capacity control valve according to claim 3, wherein a guide hole through which the valve element is inserted is formed in the valve housing on the back surface side of the valve element with respect to the suction port.

5. The capacity control valve according to claim 3, wherein a communication between the control port and the space on the back surface side of the valve element is secured when an electromagnetic force is generated in the solenoid.

6. The capacity control valve according to claim 5, wherein the solenoid includes a coil, a plunger, a center post, and the first spring arranged between the plunger and the center post, the plunger, the valve housing in which a through hole passing through in the axial direction is formed, and the center post, which is capable of closing an opening end of the through hole, cooperatively form a passage of the communication between the control port and the space on the back surface side of the valve element and the center post is movable toward the plunger by the electromagnetic force generated in the solenoid.

7. The capacity control valve according to claim 6, wherein the center post is pushed onto the valve housing by a second spring, and the second spring has larger bias force than the first spring.

8. The capacity control valve according to claim 2, wherein a communication between the control port and the space on the back surface side of the valve element is secured when an electromagnetic force is generated in the solenoid.

9. The capacity control valve according to claim 8, wherein the solenoid includes a coil, a plunger, a center post, and the first spring arranged between the plunger and the center post, the plunger, the valve housing in which a through hole passing through in the axial direction is formed, and the center post, which is capable of closing an opening end of the through hole, cooperatively form a passage of the communication between the control port and the first space on the back surface side of the valve element, and the center post is movable toward the plunger by the electromagnetic force generated in the solenoid.

10. The capacity control valve according to claim 9, wherein the center post is pushed onto the valve housing by a second spring, and the second spring has larger bias force than the first spring.

11. The capacity control valve according to claim 2, further comprising a control pressure operated valve that includes a second spring arranged in a through hole which passes through the valve housing in an axial direction, and an operated valve element to be biased in a valve closing direction of the control pressure operated valve by the second spring, and that controls a communication between the control port and the space on the back surface side of the valve element.

12. The capacity control valve according to claim 1, wherein a communication between the control port and the space on the back surface side of the valve element is secured when an electromagnetic force is generated in the solenoid.

13. The capacity control valve according to claim 12, wherein the solenoid includes a coil, a plunger, a center post, and the first spring arranged between the plunger and the center post, the plunger, the valve housing in which a through hole passing through in the axial direction is formed, and the center post, which is capable of closing an opening end of the through hole, cooperatively form a passage of the communication between the control port and the space on the back surface side of the valve element, and the center post is movable toward the plunger by the electromagnetic force generated in the solenoid.

14. The capacity control valve according to claim 13, wherein the center post is pushed onto the valve housing by a second spring, and the second spring has larger bias force than the first spring.

15. The capacity control valve according to claim 1, further comprising a control pressure operated valve that includes a second spring arranged in a through hole which passes through the valve housing in an axial direction, and an operated valve element to be biased in a valve closing direction of the control pressure operated valve by the second spring, and that controls a communication between the control port and the space on the back surface side of the valve element.

\* \* \* \* \*